July 19, 1949.    B. G. TRESNER    2,476,569
HEATING TANK FOR USE IN CUTTING SAFETY GLASS
Filed March 29, 1947
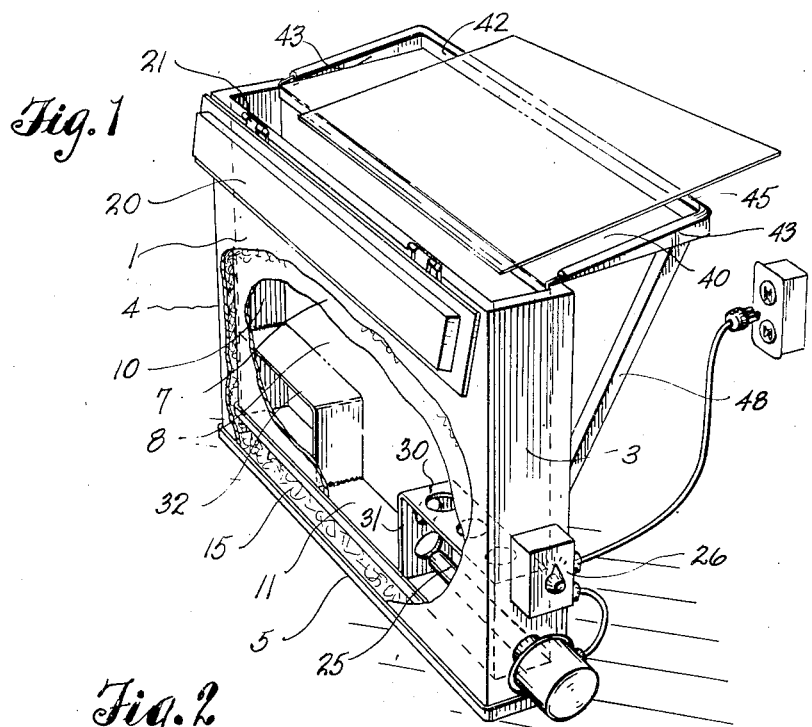
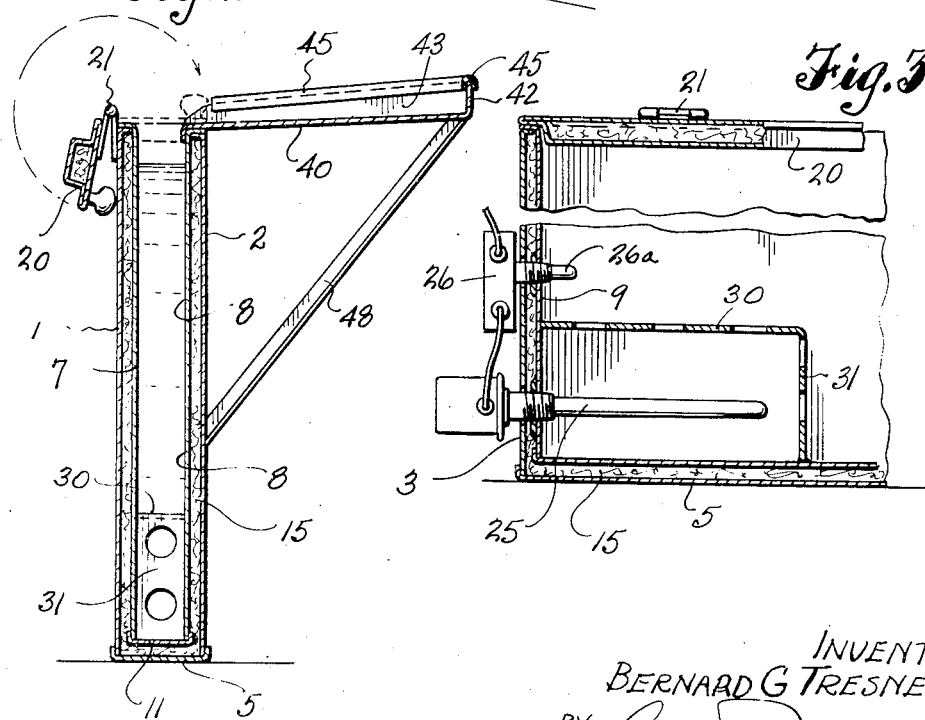
INVENTOR
BERNARD G TRESNER
BY Cook & Robinson
ATTORNEY Patented July 19, 1949

2,476,569

UNITED STATES PATENT OFFICE 2,476,569

HEATING TANK FOR USE IN CUTTING SAFETY GLASS

Bernard G. Tresner, Tacoma, Wash., assignor to Tresner & Son, Tacoma, Wash., a partnership composed of Bernard G. Tresner and Dale E. Tresner Application March 29, 1947, Serial No. 738,040

1 Claim. (Cl. 126—344)

This invention relates to equipment designed to be used to aid in the cutting of glass of that kind generally referred to as "safety glass," such as that used extensively in automobile body construction and which comprises panels having opposite surface layers of glass that are united by an interposed sheet, or layer of transparent non-breakable plastic, for example, a product that is known in trade as "vinylite."

In accordance with the teaching of the above mentioned patent, the panel of glass that is to be cut is first scored on opposite surfaces by means of a glass cutter, or other suitable tool; the lines of scoring being located directly opposite each other. Then the glass panel is cracked along the scored lines. After this cracking of the surface layers of glass, the panel is immersed in a tank of hot water and heated by the water for the purpose of softening the layer of plastic and also causing it to stretch or expand along the line of the break so that the glass pieces at opposite sides of the crack will separate a distance sufficient for the passing of the blade of a knife between them for severing the plastic layer.

It is desirable that the panel of glass be uniformly heated over its entire surface in order to avoid any danger of cracking or breaking that might result from unequal expansion. Also, it is necessary that the water be sufficiently hot that the desired softening and expanding effect on the plastic layer will result. Furthermore, it is desirable that means be provided for in close connection with the tank for holding the heated glass panel to expedite the cutting operation just as soon as the panel is withdrawn from the tank of water, thus eliminating the necessity of carrying the panel to some place of work away from the tank and permitting it to cool off by so doing.

In view of the foregoing statement, it has been the principal object of this invention to provide equipment that is designed for use in the cutting of glass of the character above mentioned, which comprises, first, a water heating tank of novel design, especially adapted to receive and contain the panels of glass therein for complete submersion in hot water, for quick and uniform heating preparatory to the cutting of the plastic layer and second, to combine with this tank a drainage table or rack onto which the heated glass panels may be disposed for cutting immediately upon being withdrawn from the hot water and from which table or rack hot water from the glass will be drained back into the water tank.

It is also an object of the invention to so design the water heating tank that the water may be economically heated to proper temperature for use by conventional, electric heating means, and the water temperature then retained with small consumption of electricity.

Still further objects of the invention reside in the details of construction of parts embodied in the equipment and in their combination and relationship, as will hereinafter be fully described.

In accomplishing the above mentioned and other objects of the invention, I have provided the improved details of construction, the preferred forms of which are illustrated in the accompanying drawings, wherein—

Fig. 1 is a perspective view of a piece of equipment designed for use in the cutting of safety glass and embodying the present invention therein.

Fig. 2 is a vertical, cross sectional view of the water heating tank and drain table.

Fig. 3 is a sectional detail of parts of the tank showing the electric water heater and the heat control thermostat.

Referring more in detail to the drawings.

In its present preferred form of construction, the piece of equipment embodied by this invention comprises a water heating tank with which is associated a drain table on which the glass panels may be placed for cutting. The tank is of such size that it will permit the placing therein a sheet of glass of the dimensions of the pieces ordinarily used in automobile windshields or in automobile doors, but which might be made of a size to accommodate larger panels of glass if necessary.

In its present preferred form of construction, the tank is of sheet metal construction, and comprises an outer casing having opposite side walls 1 and 2, opposite end walls 3 and 4 and a bottom wall 5. Within this outer casing is an inner part constituting the water tank comprising opposite side walls 7 and 8, opposite end walls 9 and 10 and a bottom wall 11. The walls of the water tank structure are spaced from the corresponding walls of the outer housing and an insulating material of suitable kind, designated at 15, is packed between them as seen in Fig. 2. It is desirable also that the water tank, which is open at the top as seen in Fig. 1, be equipped with a cover or door, such as designated at 20, and that this be hingedly attached to the front wall by hinges 21 so that it may be swung between closed and open positions.

For its intended use as an aid for the cutting of automobile glass, the tank would be approximately 54 inches long, 30 inches deep and 3 inches wide between the front and back side walls 7 and 8 and within the lower part of the tank there is mounted an electric water heating element which is designated generally by reference numeral 25. This heater element is automatically controlled by means of a thermostat 26 which is mounted on the end wall 3 of the tank casing as shown in Fig. 3 with its temperature sensitive element 26a extended through the tank wall and into the water. As shown best in Fig. 3, the heating element 25 is protected by an enclosing housing, fixed in the tank and comprising the horizontal wall portion 30 and an end wall portion 31; these parts being perforated so as to permit free circulation of water about the heating element and into the main body of the tank. Opposite the heater, a similar housing 32 is located to serve with the heater enclosing housing as a support for glass panels when lowered into the tank.

Supported from the tank, along the inside wall thereof, is a drain table 40. This preferably would be made of sheet metal. As shown it has one edge thereof overlying the top edge of the tank wall and depending into the tank. At its outer edge, the table has an upturned flange 42, and at opposite ends it has upturned flanges 43—43, over the top edges of which a rubber cushioning strip 45 is applied to prevent scratching the glass and to operate as cushions. The table may be supported in any suitable manner but herein is shown as being equipped with supporting braces 48 which are attached to its under side and to the adjacent side wall 2 of the tank casing.

Assuming that the piece of equipment is so constructed, it would be used as follows:

First, the tank would be filled substantially full of water. The electric current to the heater 25 is then turned on and the water thereby brought up to temperature of about 160°. The heating of the water can be hastened by maintaining the cover portion of the tank in closed position. After the water has been brought up to the desired temperature, the cover is swung to open position, as shown in Fig. 2, and the panel of glass which is to be cut, is then placed on the table and the opposite surface layers of glass scored, as previously described, and the glass cracked along the scored lines. Then the scored panel of glass is lowered into the hot water tank. Preferably this lowering is accomplished by means of a wooden hook of paddle-like form with long handle which eliminates the necessity of the operator getting his hands in the hot water. The panel of glass is submerged and left in the hot water about thirty seconds then is lifted out and placed on the drain table and a knife blade inserted in the crack and between the pieces of glass. Upon being heated in the water, the plastic layer becomes soft and expands to an extent that permits the easy passing of the knife blade between the glass pieces and also permits easy cutting of the plastic. Water that drips from the glass onto the table is drained back into the tank. Between jobs it is customary to keep the cover 20 closed and sufficient heat maintained by the element 25 to keep the water up to working temperature. This degree of heat may be regulated and determined through the setting of the thermostat 26.

While I have shown the tank as comprising a structure having inner and outer sheet metal walls, between which an insulating material is placed, it is to be understood that the tank might be of any other suitable construction, for example, it could be a wooden outer structure with metal lining. The adding of insulation is for the retaining or conserving of heat in the water and this to a certain extent would be accomplished through the use of a wooden tank casing.

The device as above described is very desirable for use in the cutting of glass and affords an economical, practical and effective way of heating and handling the glass panels while being cut to size.

Having thus described my invention, what I claim as new therein and desire to secure by Letters Patent, is:

A device of the character described comprising a water heating tank of substantial depth and length and relatively narrow in width, and open at its upper end for the lowering of plates of glass thereinto and for their removal from the tank, water heating means in the base of the tank for direct contact with water therein; horizontal plates fixed in the tank above the level of the said heating means for the resting of the plate of glass edgewise thereon; a drain table supported from the top edge of the tank at one side of the open end to drain into the tank, and on which plates of glass may be supported for cutting; said table having upturned flanges at its ends and outer edge and cushioning strips on said flanges; said tank having insulated walls and having a closure member for said open end hinged to the top edge of the tank wall opposite the edge from which the drain table extends.

BERNARD G. TRESNER.

REFERENCES CITED

The following references are of record in the file of this patent:

UNITED STATES PATENTS

| Number | Name | Date |
|---|---|---|
| 1,236,061 | Dawson | Aug. 7, 1917 |
| 1,722,077 | Dary | July 23, 1929 |
| 1,761,258 | Franson | June 3, 1930 |
| 1,900,582 | Owen | Mar. 7, 1933 |
| 1,943,602 | Harrison | Jan. 16, 1934 |
| 2,396,578 | Kittel et al. | Mar. 12, 1946 |